US010000859B2

(12) United States Patent
Browning et al.

(10) Patent No.: US 10,000,859 B2
(45) Date of Patent: Jun. 19, 2018

(54) HARD ALUMINUM FILMS FORMED USING HIGH CURRENT DENSITY PLATING

(71) Applicant: ALUMIPLATE, INC., Coon Rapids, MN (US)

(72) Inventors: Lucy Elizabeth Browning, Cupertino, CA (US); William Charles Carlson, Coon Rapids, MN (US); Jon Frederick Schulz, Coon Rapids, MN (US); Gustavo Rolando Vallejo, Coon Rapids, MN (US)

(73) Assignee: Alumiplate, Inc., Coon Rapids, MN (US)

( * ) Notice: Subject to any disclaimer, the term of this patent is extended or adjusted under 35 U.S.C. 154(b) by 245 days.

(21) Appl. No.: 14/768,497

(22) PCT Filed: Feb. 18, 2014

(86) PCT No.: PCT/US2014/016911
§ 371 (c)(1),
(2) Date: Aug. 18, 2015

(87) PCT Pub. No.: WO2014/130452
PCT Pub. Date: Aug. 28, 2014

(65) Prior Publication Data
US 2016/0002805 A1 Jan. 7, 2016

Related U.S. Application Data

(60) Provisional application No. 61/766,633, filed on Feb. 19, 2013, provisional application No. 61/907,323, filed on Nov. 21, 2013.

(51) Int. Cl.
*C25D 5/10* (2006.01)
*C25D 11/04* (2006.01)
(Continued)

(52) U.S. Cl.
CPC .............. *C25D 5/10* (2013.01); *B32B 15/016* (2013.01); *C25D 3/44* (2013.01); *C25D 5/48* (2013.01);
(Continued)

(58) Field of Classification Search
CPC ... C25D 5/10; C25D 3/44; C25D 5/48; C25D 11/04; C25D 17/008; B32B 15/016
See application file for complete search history.

(56) References Cited

U.S. PATENT DOCUMENTS 2,798,037 A * 7/1957 Preston .................. C23C 24/00
205/172
6,258,466 B1   7/2001 McTeer
(Continued)

FOREIGN PATENT DOCUMENTS

EP      2330233         6/2011

OTHER PUBLICATIONS

PCT Search Report and Written Opinion for US2014/016911 dated May 23, 2014 (15 pages).
(Continued)

*Primary Examiner* — John E Uselding
(74) *Attorney, Agent, or Firm* — Mueting, Raasch & Gebhardt, P.A.

(57) ABSTRACT

The described embodiments relate generally to aluminum films and methods for forming aluminum films. Methods involve providing aluminum films having increased hardness. Methods involve using higher than conventional current densities during plating of aluminum on substrates. The higher current density plating creates aluminum films with grain structures that are different from conventional plated aluminum films. In some embodiments, the average grain sizes are smaller in the hard aluminum films than conventional plated aluminum films. In some embodiments, the
(Continued)

plated aluminum layer is anodized. In some embodiments, a multi-layered aluminum coating is formed using a combination of high current density and low current density plating. In some embodiments, a current filter is used to provide uniform plating across a part.

8 Claims, 18 Drawing Sheets

(51) Int. Cl.
*C25D 17/00* (2006.01)
*C25D 3/44* (2006.01)
*C25D 5/48* (2006.01)
*C25D 11/16* (2006.01)
*B32B 15/01* (2006.01)
*C25D 11/12* (2006.01)
*C25D 17/08* (2006.01)
*C23C 18/16* (2006.01)

(52) U.S. Cl.
CPC .............. *C25D 11/04* (2013.01); *C25D 11/12* (2013.01); *C25D 11/16* (2013.01); *C25D 17/008* (2013.01); *C23C 18/1653* (2013.01); *C25D 17/08* (2013.01)

(56) References Cited

U.S. PATENT DOCUMENTS

| | | |
|---|---|---|
| 2004/0235289 A1 | 11/2004 | Suzuki |
| 2006/0145150 A1 | 7/2006 | Park |
| 2011/0081539 A1 | 4/2011 | Ni |
| 2014/0178710 A1* | 6/2014 | Chen ................. C25D 5/10 428/610 |
| 2015/0299884 A1* | 10/2015 | Chen ................. C25D 5/10 205/103 |

OTHER PUBLICATIONS

PCT International Preliminary Examination Report for US2014/016911 dated Sep. 3, 2015 (12 pages).

* cited by examiner

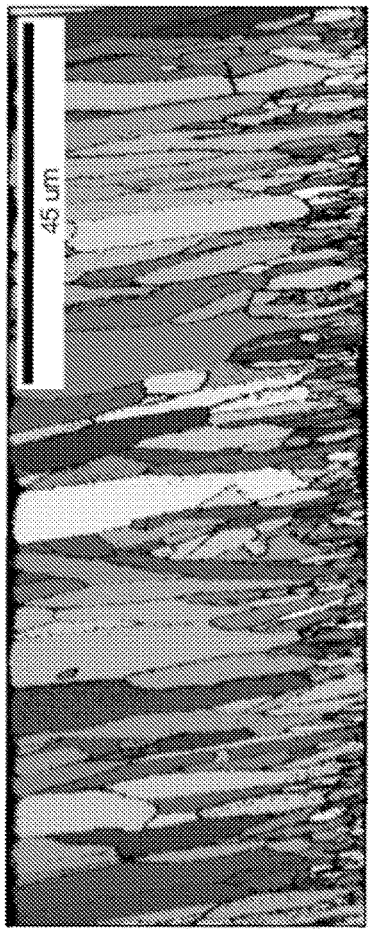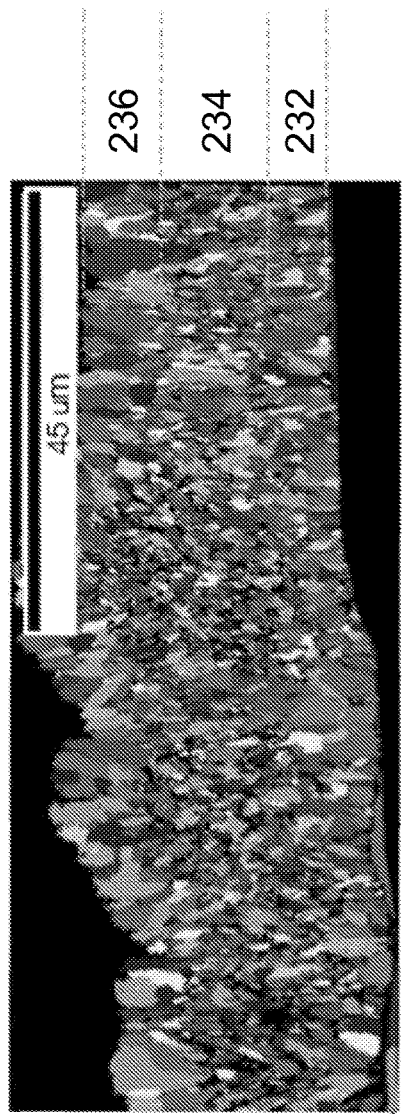
FIG. 2E
FIG. 2F

US 10,000,859 B2

HARD ALUMINUM FILMS FORMED USING HIGH CURRENT DENSITY PLATING

This application is a U.S. National Stage Application of International Application No. PCT/US2014/016911, filed Feb. 18, 2014, which was published in English on Aug. 28, 2014 as International Patent Publication WO 2014/130452 A1, and which claims the benefit under 35 U.S.C. 119(e) of U.S. Provisional Application Nos. 61/766,633, filed Feb. 19, 2013 and 61/907,323, filed Nov. 21, 2013; all of which are incorporated herein by reference in their entirety.

FIELD

This disclosure relates generally to aluminum films and methods for plating aluminum films. In particular, high current density electroplating techniques used to form hard aluminum films are described.

BACKGROUND

Electroplating is a process widely used in industry to provide a metal coating having a desirable physical quality on a part. For example, electroplated coatings can provide abrasion and wear resistance, corrosion protection and aesthetic qualities to the surfaces of parts. Electroplated coating may also be used to build up thickness on undersized parts.

Aluminum substrates, in particular, can be difficult to plate since aluminum surfaces rapidly acquire an oxide layer when exposed to air or water, and thus tend to inhibit good adhesion of an electrodeposited film. In addition, since aluminum is one of the more anodic metals, there is a tendency to form unsatisfactory immersion deposits during exposure to a plating solution, which can cause discontinuous plating or breakdown of the plating process. Furthermore, if plating an aluminum film, plating methods usually involve the plating of pure aluminum metal onto the substrate. Although pure aluminum has an ordered microstructure and good cosmetic properties, it is relatively soft and easily scratched. Therefore, there are significant challenges to plating aluminum in industrial applications where durability is a desirable characteristic of a plated film.

SUMMARY

This paper describes various embodiments that relate to aluminum films with increased hardness.

According to one embodiment, a method of forming a multi-layered aluminum coating on a substrate is described. The method includes electrodepositing a first portion of the aluminum layer on the substrate using a first current density causing the first portion to have a first average grain size. The method also includes electrodepositing a second portion of the aluminum layer on the first portion using a second current density that is lower than the first current density. Electrodepositing at the second current density causes the second portion to have a second average grain size larger than the first average grain size.

According to an additional embodiment, a multi-layered aluminum coating disposed on a substrate is described. The multi-layered aluminum coating includes at least one hard aluminum layer having a first average grain size. The multi-layered aluminum coating also includes at least one cosmetic aluminum layer adjacent the hard aluminum layer. The cosmetic aluminum layer has a second average grain size larger than the first average grain size. A top layer of the multi-layered aluminum coating corresponds to a cosmetic aluminum layer.

According to a further embodiment, a method of forming an aluminum layer on a substrate is described. The method includes depositing a first aluminum portion of the aluminum layer at a first deposition rate on the substrate. Depositing at the first deposition rate causes the first aluminum portion to have a first hardness value. The method also includes depositing a second aluminum portion of the aluminum layer at a second deposition rate on the first aluminum portion. Depositing at the second deposition rate causes the second aluminum portion to have a second hardness value. The first deposition rate is greater than the second deposition rate and the second hardness value is greater than the first hardness value.

According to another embodiment, an aluminum coating disposed on an enclosure for an electronic device is described. The aluminum coating includes a hard aluminum layer having a first average grain size. The aluminum coating also includes a cosmetic aluminum layer adjacent the hard aluminum layer. The cosmetic aluminum layer has a second average grain size larger than the first average grain size. The aluminum coating has an average grain size of about 1.8 micrometers.

According to an additional embodiment, a method for plating aluminum on a surface of a substrate is described. The method includes exposing the substrate surface to an electrolytic bath having a number of aluminum ions dispersed therein. The substrate surface including a first surface portion and a second surface portion. The method also includes causing the aluminum ions to flow toward the substrate surface by applying an electric field to the electrolytic bath. A flow of aluminum ions toward the first surface portion is greater than a flow of aluminum ions toward the second surface portion. The method further includes controlling a proportion of aluminum ions reaching the first surface portion and the second surface portion of the substrate surface such that an amount of aluminum plated on the first surface portion is substantially the same as an amount of aluminum plated on the second surface portion.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIGS. 2A-2F show top and cross section views of aluminum samples formed using different current density plating processes.

DETAILED DESCRIPTION

Figure 1:
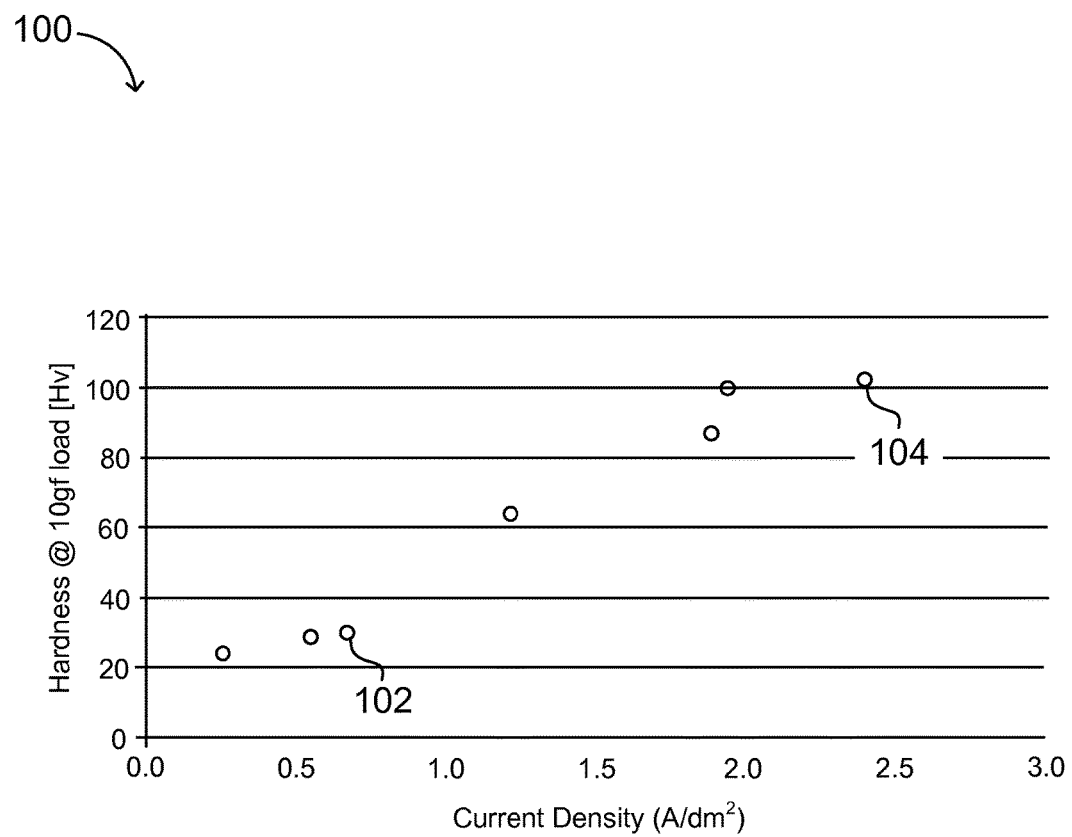
FIG. 1 shows a graph showing hardness values for aluminum samples plated using different current density plating processes.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

This application relates to aluminum films and providing aluminum films on substrates using plating methods. As used herein, the terms "film" and "layer" are used interchangeably. Unless otherwise described, as used herein, "aluminum" and "aluminum layer" can refer to any suitable aluminum-containing material, including pure aluminum, aluminum alloys or aluminum mixtures. As used herein, "pure" or "nearly pure" aluminum generally refers to aluminum having a higher percentage of aluminum metal compared to aluminum alloys or other aluminum mixtures. The aluminum films are well suited for providing both protective and attractive layers or coatings to consumer products. For example, methods described herein can be used for providing protective and cosmetically appealing exterior portions of enclosures and casings for electronic devices.

Described herein are methods for providing aluminum layers or coatings having superior hardness. In some embodiments, the hard aluminum layers have a smaller than typical average grain size that gives the aluminum layers increased hardness. In some embodiments, the hard aluminum layers have a stratified grain structure. The hard aluminum layers can be formed by electroplating aluminum onto substrates using higher than conventional current densities. In some embodiments, the aluminum coatings include multiple layers. In a particular embodiment, an aluminum coating includes a hard aluminum layer and a cosmetic aluminum layer.

These and other embodiments are discussed below with reference to FIGS. 1-9. However, those skilled in the art will readily appreciate that the detailed description given herein with respect to these Figures is for explanatory purposes only and should not be construed as limiting.

As described above, it can be difficult to produce a pure or a nearly pure aluminum layer that has the satisfactory durability for many industrial applications. Pure or nearly pure aluminum typically has a hardness value of less than about 40 Hv, making it too soft for many applications. One method for improving the hardness of an aluminum layer is to convert a surface of the aluminum layer to an aluminum oxide layer. Aluminum oxide layers typically have hardness values of 300 Hv and over, and therefore can provide a protective hard coating over the softer aluminum. However, even with the protective oxide layer, a surface of a part can still be easily gouged and marred. This is because the relatively soft pure aluminum layer is situated between a relatively hard underlying substrate and a relatively hard aluminum oxide layer.

One method for providing a plated aluminum layer having increased hardness involves plating using a higher than conventional current density. Current density is a measurement of amperage of the electroplating current divided by the surface area of the part ($A/dm^2$). During a plating process, an average current density at the substrate surface can be back-calculated by measuring the amount of aluminum that has been plated onto a substrate over a given time period. For example, the amount of plated aluminum can be calculated by weighing the substrate before and after a plating process. The current density is proportional to the rate of deposition. In general, the higher the current density, the higher the rate of aluminum that is plated. The rate of plating can be directly related to the hardness of the resultant aluminum film, with higher current densities forming harder films. This is illustrated at FIG. 1, which shows graph 100 showing hardness values (HV) for different aluminum samples plated with different current densities ($A/dm^2$). The hardness values were measured using a Vicker's hardness tests at 10 gf load. As shown, those aluminum samples plated at higher current densities have higher hardness values. For example, the hardness value of sample 104 plated using about 2.4 $A/dm^2$ current density is over about 100 HV, whereas the hardness value of sample 102 plated using about 0.7 $A/dm^2$ current density is about 30 HV.

Figure 2B:
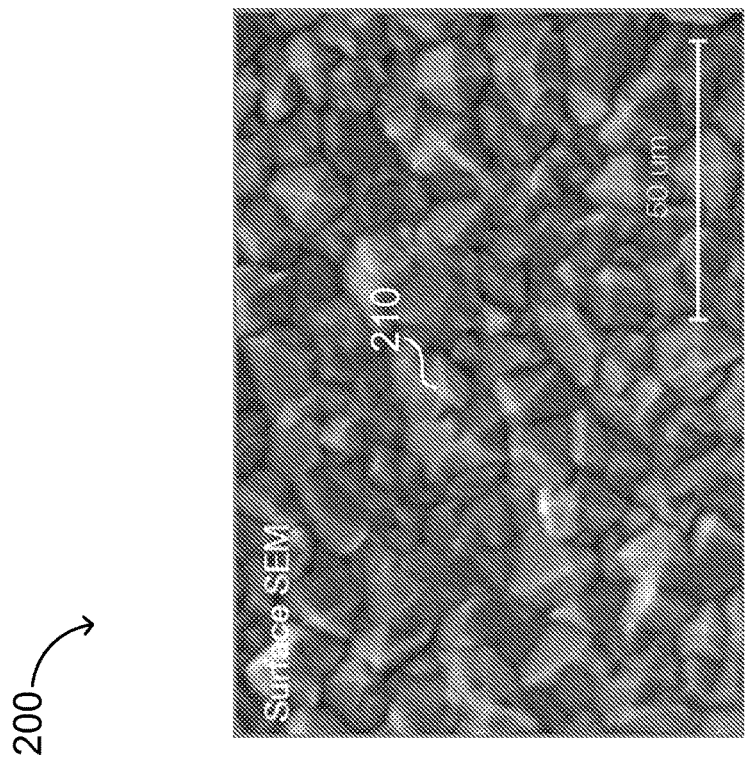
Figure 2A:
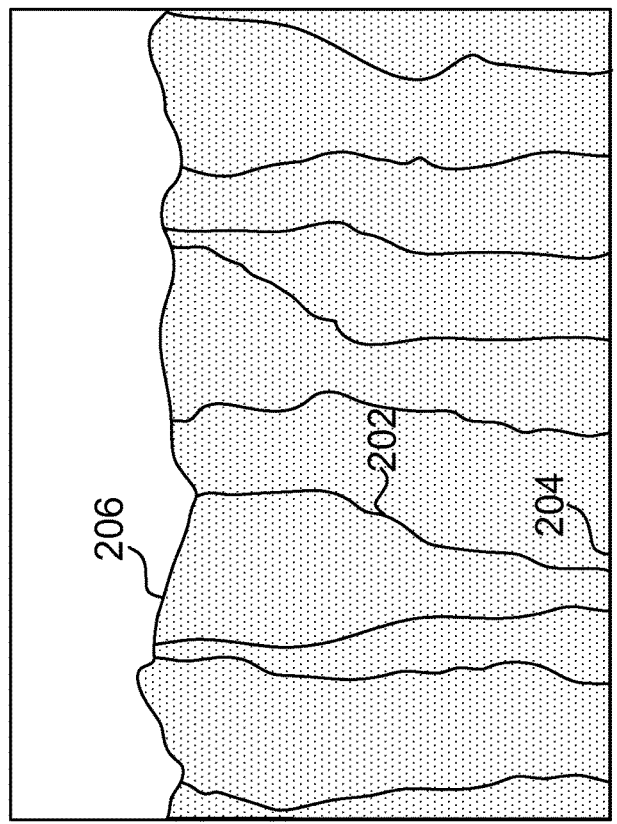
Figures 2C, 2D:
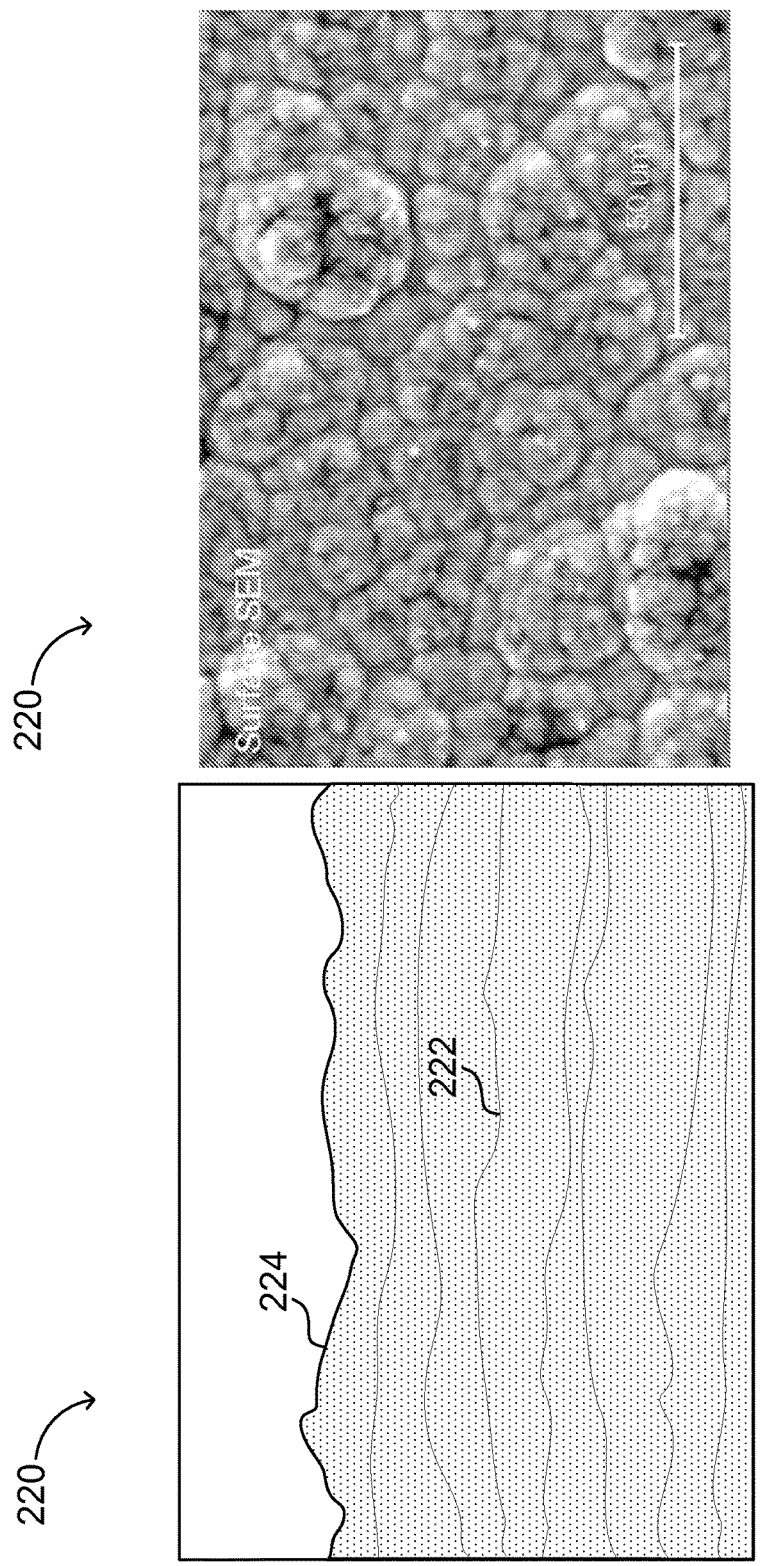

Plating at higher current densities can form aluminum layers having different grain structures compared to those films formed by plating at lower current densities. To illustrate, FIGS. 2A-2F show images of aluminum layers formed using a standard (low) current density plating process, a high current density plating process, and a combination of high and low current density plating processes. In particular, FIGS. 2A shows a cross section and 2B shows a scanning electron microscope (SEM) image of a top surface of aluminum layer 200 corresponding to sample 102 using lower current density. FIGS. 2C shows a cross section and 2D shows a SEM image of a top surface of aluminum layer 220 corresponding to sample 104 using higher current density. FIG. 2E shows an electron backscatter diffraction (EBSD) cross section image of an aluminum sample 225 formed using low current density plating process. FIG. 2F shows an EBSD cross section image of an aluminum sample 230 formed using a combination of high current density and low current density plating processes.

As shown at FIG. 2A, plating at a lower current density results in a columnar grain structure wherein grain boundaries 202 run vertically from bottom 204 to top 206 of aluminum layer 200. In addition, as shown at FIG. 2B, plating at lower current density results in an aluminum layer 200 having a surface with large sharp faceted grain peaks 210. In contrast, FIG. 2C shows that plating at a higher current density results in a stratified grain structure wherein grain boundaries 222 run laterally within aluminum layer 220. FIG. 2D shows that aluminum layer 220 formed at higher current density has a surface with rough facets. It is believed that the stratified grain structure of aluminum layer 220 is associated with an increased mechanical hardness. That is, aluminum layer 220 is more resistant to scratching, gouging, or denting compared to aluminum layer 200.

Furthermore, because aluminum layer 220 is deposited at a higher rate compared to aluminum layer 200, there is an increased likelihood of co-deposition of impurities from the electrolytic bath along with aluminum. The impurities can include, for example, chemical byproducts of the electroplating process. These impurities can disrupt the growth of a typical columnar grain structure, and can contribute to the hard mechanical quality of aluminum layer 220. In addition to differing mechanical qualities, aluminum layer 220 can have different cosmetic qualities than aluminum layer 200. In particular, aluminum layer 220 can have a duller and optically darker appearance compared to aluminum layer 200. In addition, when aluminum layer 220 is converted to aluminum oxide, using for example an anodizing process, the resultant aluminum oxide layer can appear more yellow and have more of a matt appearing quality compared to that of an aluminum oxide layer formed from aluminum layer 200.

Additionally, aluminum layers plated at higher current densities generally have smaller average grain sizes and different grain orientations compared to aluminum layers plated at lower current densities. To illustrate, FIG. 2E shows an EBSD cross section view of aluminum layer 225 plating at a standard (low) current density. As shown, aluminum layer 225 has grains grown in a similar direction ([0, 1, −1)]), thereby giving aluminum layer 225 a prominent grain texture. The grain size is also relatively large, ranging from about 1 to 14 micrometers with an average grain size of about 2.3 micrometers.

FIG. 2F shows an EBSD cross-section view of multi-layered aluminum coating 230 plated using a combination of high and low current density processes. Multi-layered aluminum coating 230 includes layers 232, 234 and 236. Layer 232 corresponds to a ramp process whereby the current density is ramped up to a high current. Layer 234 corresponds to a high current density portion of the plating process. Layer 236 corresponds to a low current density portion of the plating process. Low current density layer 236 can be referred to as a cosmetic aluminum layer since it can improve an appearance of resulting aluminum coating 230 after a subsequent anodizing process, which will be described further below in detail.

As shown by the differences in grain structures of layer 234 compared to layers 232 and 236, plating at high current density conditions results in layer 234 having a smaller grain size. In addition, the grains of layer 234 show no substantial preferential orientation or prominent grain texture. Smaller grains have more grain boundaries per unit volume, which increases resistance to dislocations and deformation and results in a harder material. The grain size of resultant aluminum coating 230, which includes layers 232, 234 and 236, is on average smaller and less oriented than aluminum layer 225 plated using a low current density. In some embodiments, the grain sizes of aluminum coating 230 ranges from about 0.1 to about 4 micrometers, with an average grain size of about 1.8 micrometers.

Higher current density plating can result in plated aluminum films with rougher surface textures compared to aluminum films plated with low current density. In some embodiments, it is been found that the type of substrate that the aluminum film is plated on can affect the amount of roughness of the resultant plated aluminum film. In particular, aluminum substrates with higher alloying content can form smoother plated aluminum films. Higher alloying content refers to aluminum alloys having higher relative percentages of non-aluminum material.

Figure 3A:
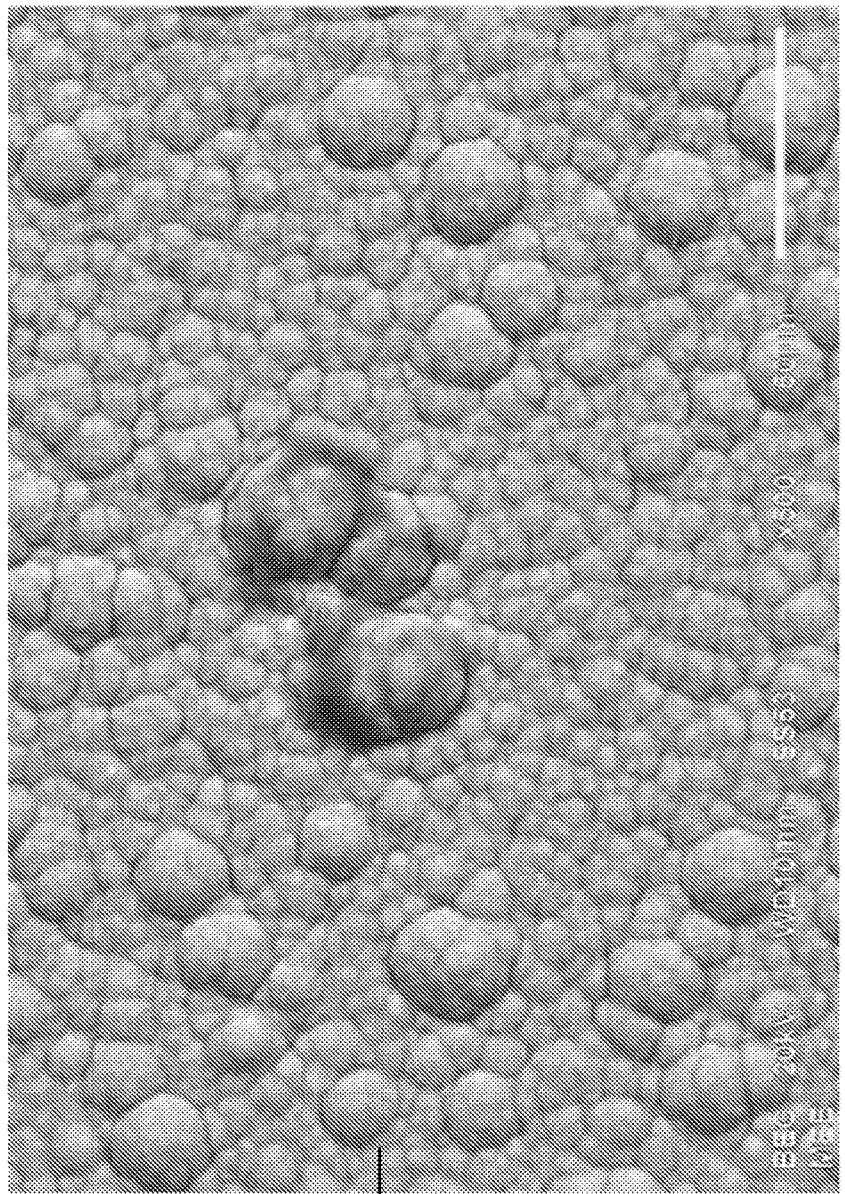
FIGS. 3A and 3B show top views of aluminum samples plated on substrates having different alloying contents.
Figure 3B:
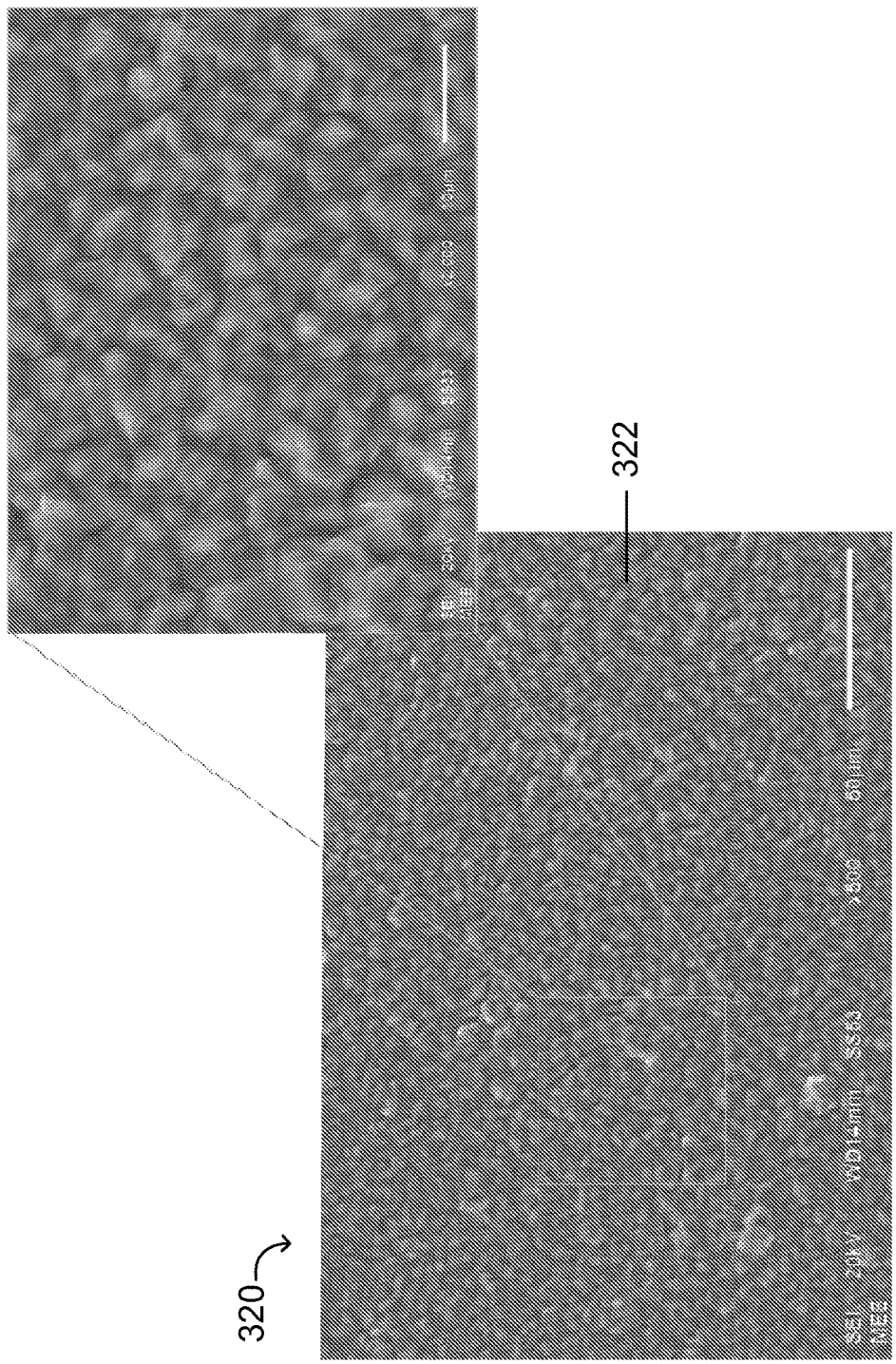

FIGS. 3A and 3B illustrate the effects of substrate alloying content on resultant plated aluminum layers. FIGS. 3A and 3B show SEM images of top views of two parts, 300 and 320, with aluminum plated on two different aluminum alloy substrates. Both parts 300 and 320 were plated using the same current density conditions: an initial current density ramp period, a high density plating period, and a low current density plating period. FIG. 3A shows a top surface of aluminum layer 302, which is plated on a low alloy content (e.g., Al-6063) aluminum substrate. As shown, the surface of aluminum layer 302 has a rough faceted surface. FIG. 3B shows a top surface and close-up (inset) views of aluminum layer 322 plated on a higher alloy content (e.g., Al-6061 or Al-7075) aluminum substrate. As shown, the surface of aluminum layer 322 is less rough than aluminum layer 302. That is, although the surface of aluminum layer 322 has facets, the facets are smaller than the facets of aluminum layer 302, corresponding to a smoother surface.

Figure 4A:
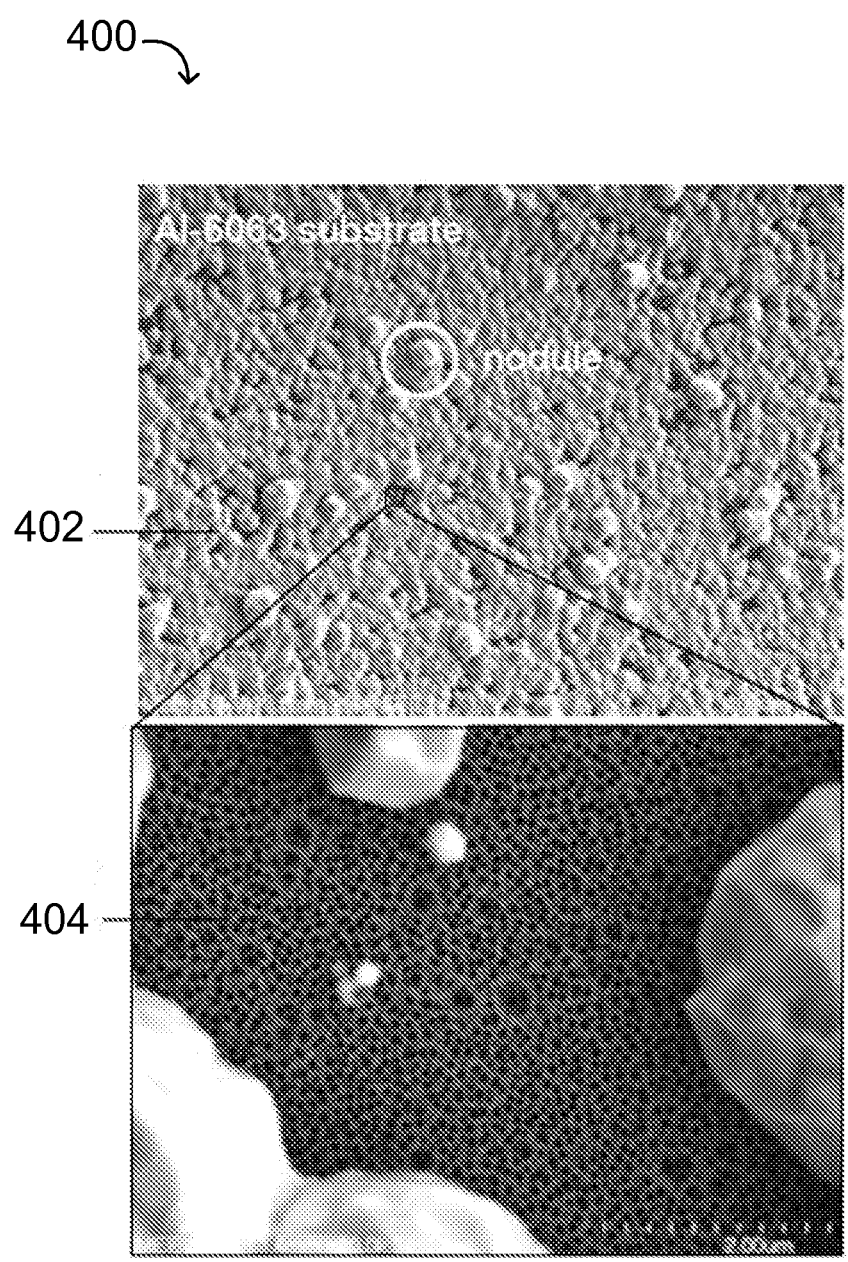
FIGS. 4A-4C show top views of aluminum samples plated on substrates having different alloying contents.
Figure 4B:
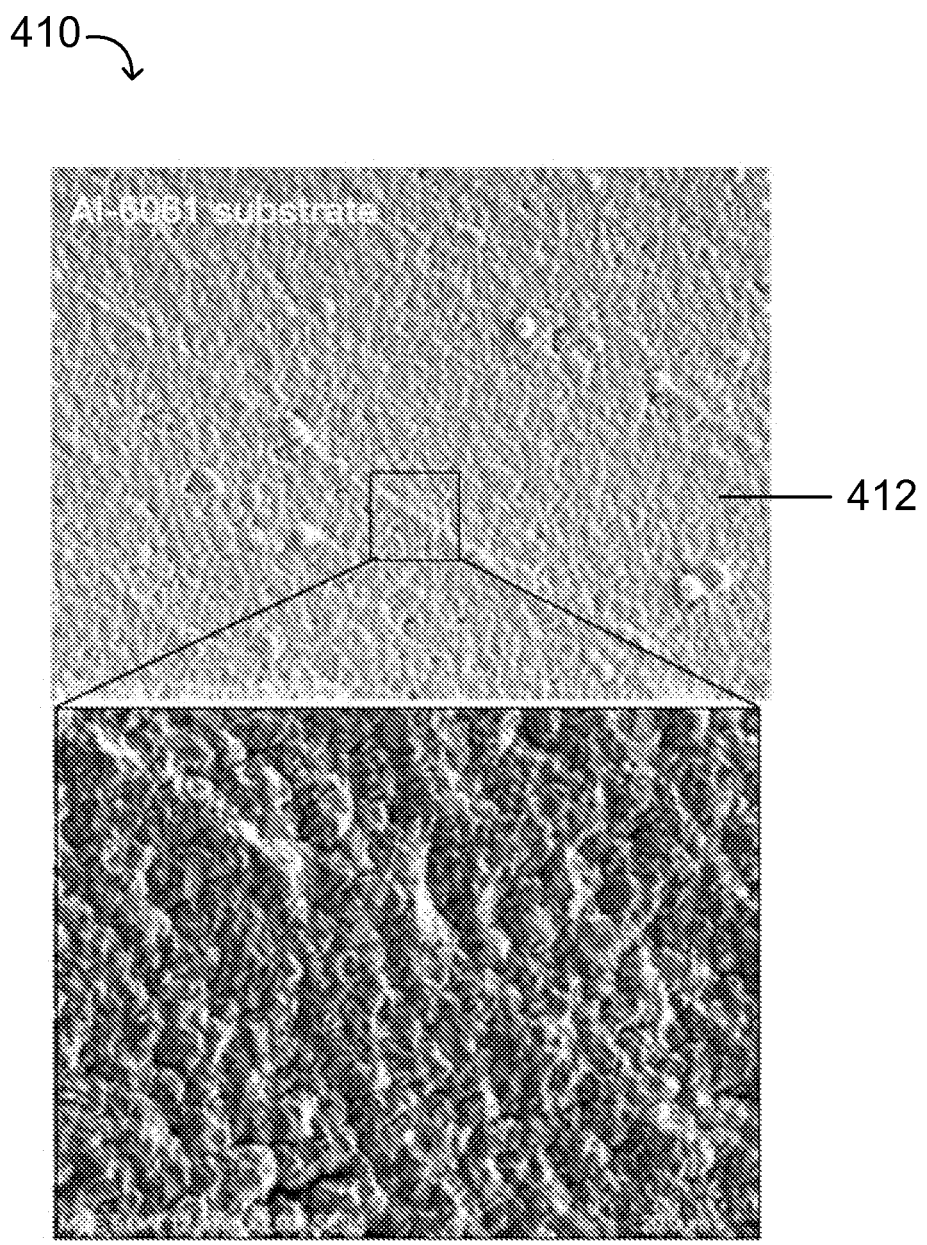
Figure 4C:
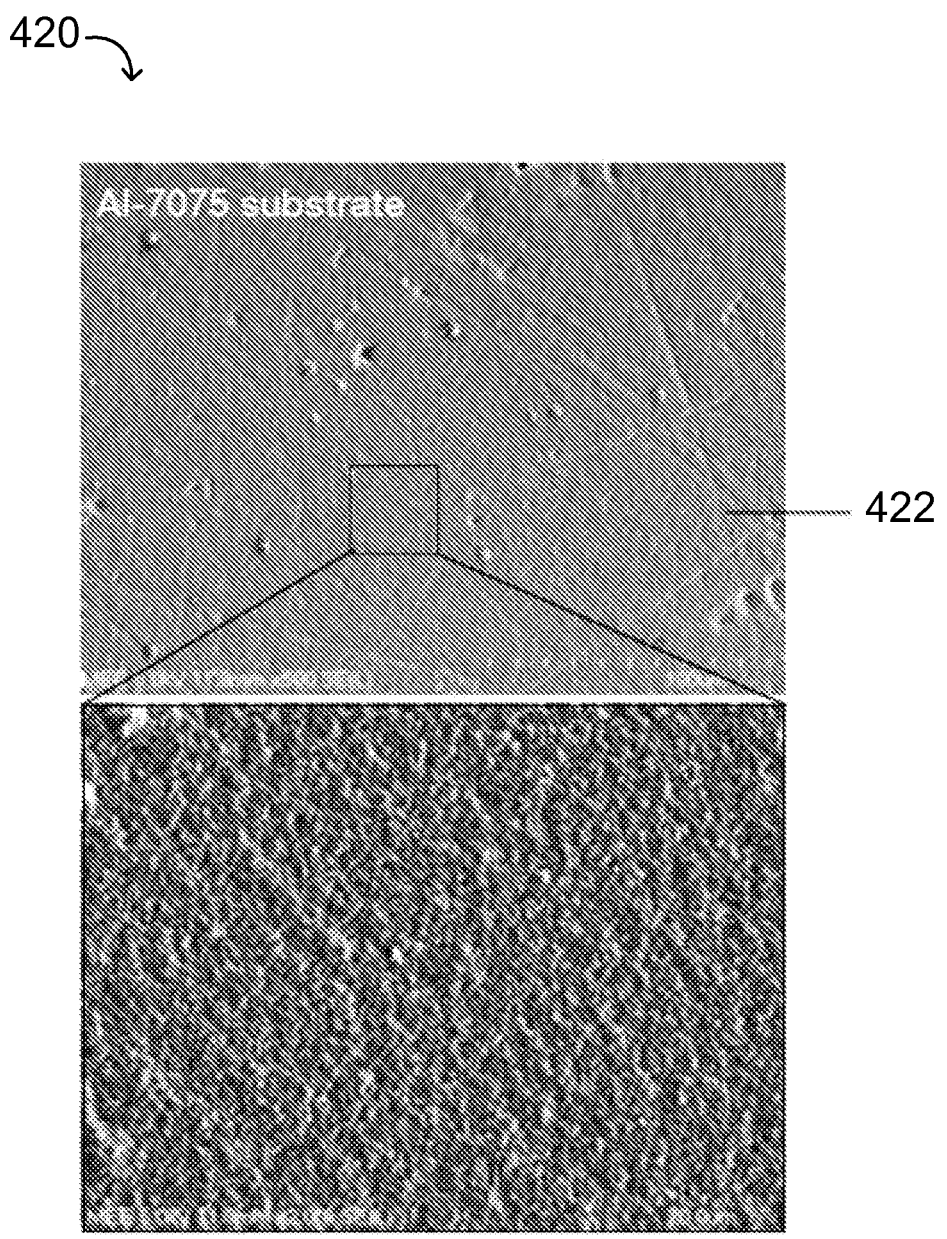

FIGS. 4A-4C show SEM images of some more samples illustrating the effects of using different substrates during high current density plating. FIG. 4A shows a top view and a close-up (inset) view of the surface of part 400 after a low current density ramping procedure on an Al-6063 alloy substrate. A low current density ramping procedure can be used to allow plating grains to nucleate on the surface of part 400. As shown, the surface of plated aluminum layer 402 is rough and has nodules. The close-up (inset) view shows that coverage of aluminum layer 402 is incomplete since aluminum layer 402 has gaps 404.

FIG. 4B shows a top view and close-up (inset) view of part 410 after a high current density plating procedure on an Al-6061 alloy substrate. As shown, the surface of plated aluminum layer 412 is smoother and has less nodules than that of aluminum layer 402 (Al-6063 alloy). In addition, coverage of aluminum layer 412 is complete with substantially no gaps. FIG. 4C shows a top view and a close-up (inset) view of part 420 after a high current density plating procedure on an Al-7075 alloy substrate. As shown, the surface of plated aluminum layer 422 is smoother and has less nodules than that of aluminum layer 412 (Al-6061) and aluminum layer 402 (Al-6063 alloy). In addition, the coverage of aluminum layer 422 is complete with substantially no gaps.

It is believed that the smoother surfaces of aluminum layers 412 and 422 are attributed to the larger volume percentage of secondary phase particles that exist in higher alloy content aluminum substrates. These secondary phase particles correspond to local areas of high current density during a plating process. Aluminum can nucleate at these high current density areas during the initial stages of plating (e.g., ramp up to high current density conditions). Thus, aluminum substrates that have more secondary phase particles produce more nucleation sites for plating and provide a more even coverage of plated aluminum.

FIGS. 5A-5D show cross-section views of part 500 undergoing a plating process using a high current density plating process. At FIG. 5A, part 500 includes substrate 502 having optional strike layer 504 deposited thereon. In general, strike layer 504 is a very thin (typically a few micrometers or less) metal layer that adheres well with substrate 502 and promotes adhesion of a subsequently plated aluminum layer. Typical strike layer 504 metals can include, but are not limited to, copper and nickel. In some embodiments, an electroless plating process is used to form strike layer 504. In electroless plating there is no electrical bias so there is substantially no current density distribution across part 500. Thus, strike layer 504 can grow at the same rate along the surface of substrate 502, creating a very evenly distributed strike layer 504. Thus, electroless plating can be referred to as a "self-leveling" process. Note that in alternative embodiments, strike layer 504 is not used.

Figure 5A:
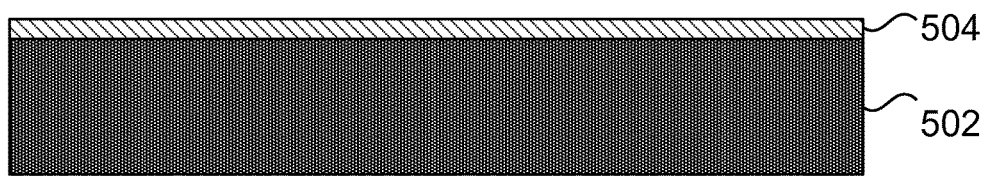
FIGS. 5A-5D show cross section views of a part undergoing a plating process using a high current density process conditions.
Figure 5B:
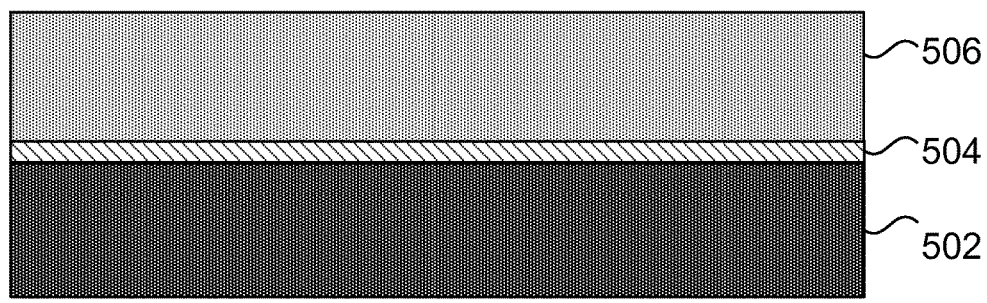

At FIG. 5B, hard aluminum layer 506 is deposited on strike layer 504 using a high current density plating process. Note that in some embodiments, a ramp layer is formed, corresponding to an aluminum layer formed while the current density is ramped up to the high current density. For simplicity, a ramp aluminum layer is not shown in FIG. 5B. As described above, the high current density plating can produce aluminum layer 506 having a small grain structure that can contribute to its hard quality. In some embodiments, hard aluminum layer 506 is plated with a target hardness value of about 80 HV or higher. In some embodiments, hard aluminum layer 506 is plated with a target hardness value of about 100 HV or higher.

Hard aluminum layer 506 can have different cosmetic qualities than an aluminum layer plating using a standard lower current density. In particular, hard aluminum layer 506 can have a duller and optically darker appearance than an aluminum layer plated using a standard lower current density. In addition, anodizing hard aluminum layer 506 can resultant in an aluminum oxide layer that appears yellowish. In some applications, the duller and darker appearance of hard aluminum layer 506 and the yellowish aluminum oxide layer can be cosmetically unappealing. Thus, in these applications it can be desirable to deposit a cosmetic aluminum layer over hard aluminum layer 506.

Figure 5C:
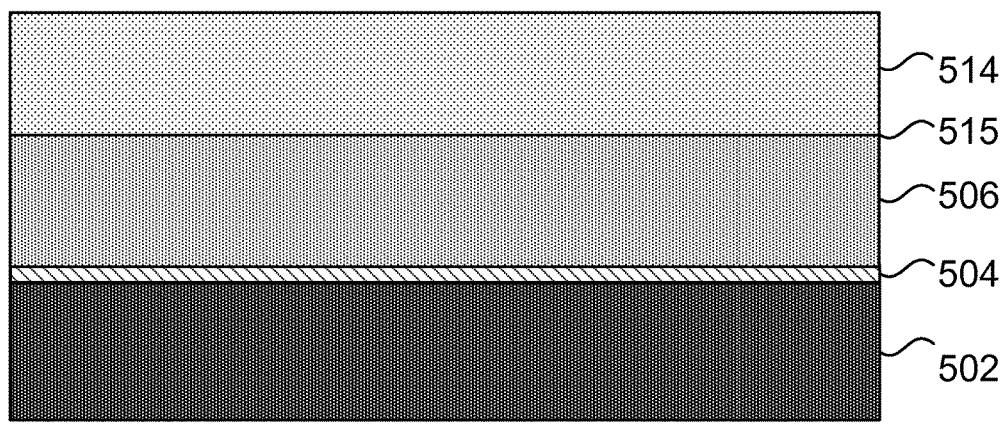

At FIG. 5C, cosmetic aluminum layer 514 is optionally deposited on hard aluminum layer 506 forming a multi-layered aluminum coating 501. Cosmetic layer 514 can be used in applications where it is desirable to have a top layer, corresponding to a visible surface of part 500, that has an optically brighter appearance than hard aluminum layer 506. That is, cosmetic aluminum layer 514 can provide a cosmetically appealing outer surface of part 500 while hard aluminum layer 506 can provide mechanical strength and hardness to part 500. Boundary 515 indicates the boundary between hard aluminum layer 506 and cosmetic aluminum layer 514. Cosmetic aluminum layer 514 can be formed using, for example, a plating process using a lower current density compared to the plating process for forming hard aluminum layer 506. In some embodiments, the composition of cosmetic aluminum layer 514 is chosen for optimal optical brightness. For example, cosmetic aluminum layer 514 can be made of substantially pure aluminum or nearly pure aluminum, which is nominally brighter than many aluminum alloys.

Figure 5D:
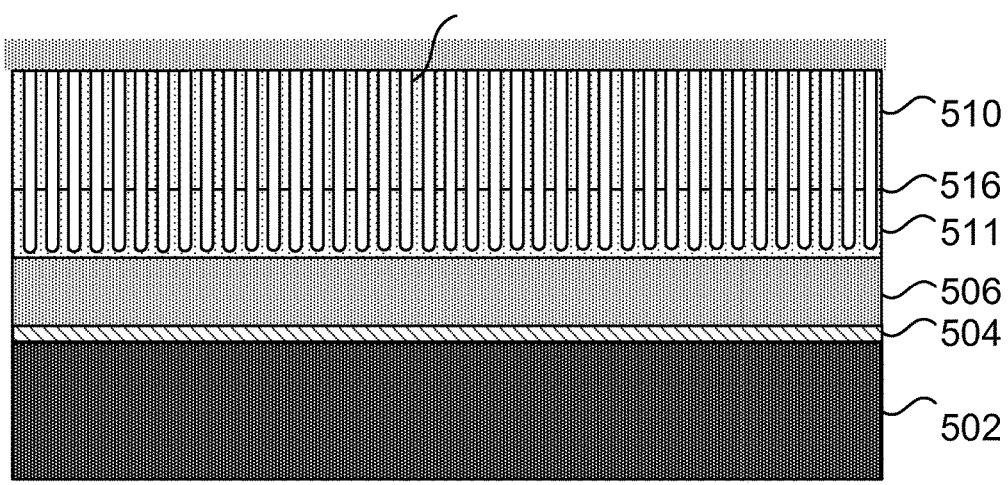

At FIG. 5D, cosmetic layer 514 is converted to aluminum oxide layer 510 and a portion of hard aluminum layer 506 is converted to aluminum oxide layer 511. Aluminum oxide layers 510 and 511 can have different appearances. For example, aluminum oxide layer 511 can have a yellow hue and aluminum oxide layer 510 can have a hazy or matte appearance. As shown, a portion of hard aluminum layer 506 can be left unconverted. In other embodiments, substantially all of hard aluminum layer 506 is converted to aluminum oxide layer 511. In other embodiments, only a portion of cosmetic aluminum layer 514 is converted to aluminum oxide layer 510 and substantially all of hard aluminum layer 506 is left unconverted. Aluminum oxide layers 510 and 511 have boundary 516 that corresponds to boundary 515 between hard aluminum layer 506 and cosmetic aluminum layer 514. As shown, aluminum oxide layers 510 and 511 have a number of pores 512 that run in a substantially vertical direction from near the bottom of aluminum oxide layer 511, transcend boundary 516, and continue to the top of aluminum oxide layer 510.

Figure 6A:
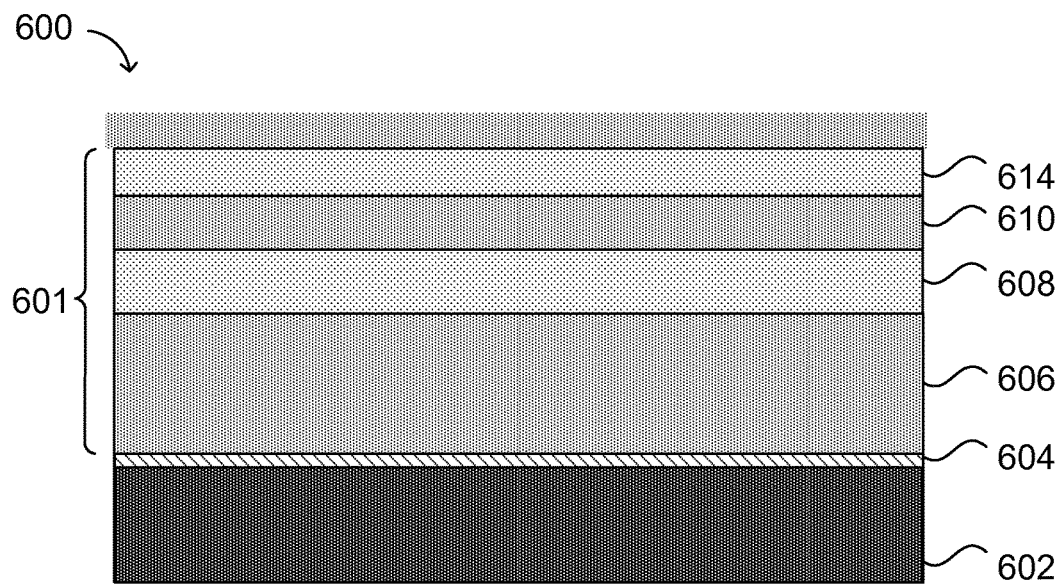
FIGS. 6A and 6B show cross section views of a part having a multi-layered aluminum coating with hard aluminum layers undergoing an anodizing process.
Figure 6B:
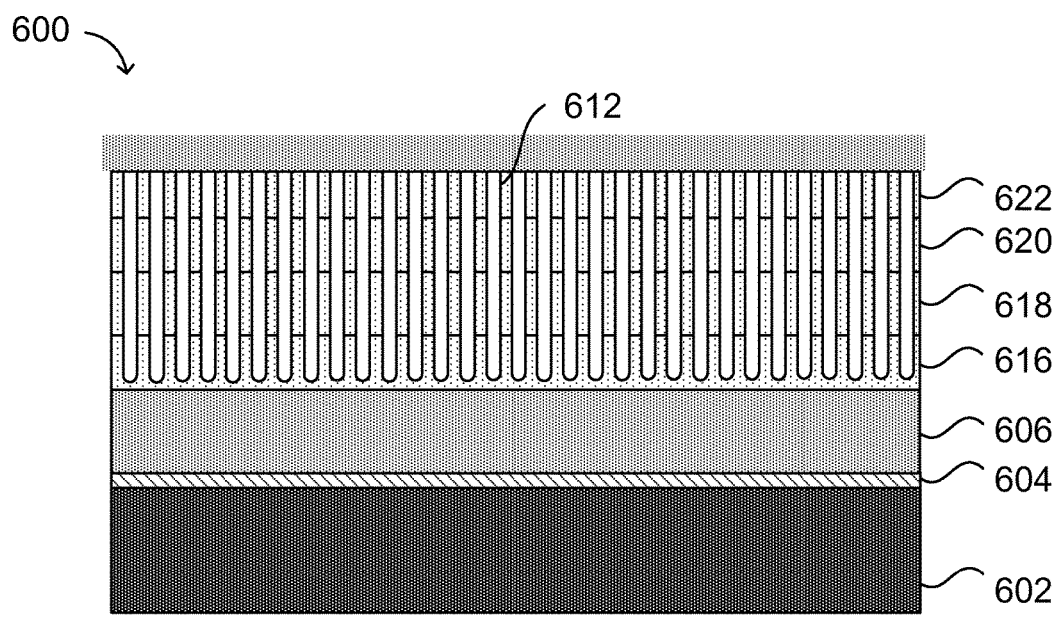

In some embodiments, multiple layers of hard and cosmetic aluminum layers are consecutively deposited. FIGS. 6A and 6B show cross-section views of part 600 having a multi-layered aluminum coating according to some embodiments. At 6A, multi-layered aluminum coating 601 is disposed on strike layer 604, which is disposed on substrate 602. In some embodiments, strike layer 604 is absent. Multi-layered aluminum coating 601 includes a first hard aluminum layer 606 formed using high current density plating, first cosmetic aluminum layer 608 formed using standard low current density plating, second hard aluminum layer 610 formed using high current density plating, and second cosmetic aluminum layer 614 formed using standard low current density plating. Hard aluminum layers 606 and 610 can provide a hard quality to multi-layered aluminum coating 601 and cosmetic aluminum layers 608 and 614 can provide a ductility and cosmetically appealing quality to multi-layered aluminum coating 601. In some embodiments, hard aluminum layers 606 and 610 are formed using the same or different process parameters (e.g. current densities). In some embodiments, cosmetic aluminum layers 608 and 614 are formed using same or different process parameters (e.g. current densities).

At FIG. 6B, cosmetic aluminum layers 614 and 608, hard aluminum layer 610, and a portion of hard aluminum layer 606 are converted to aluminum oxide using an anodizing process. In particular, cosmetic aluminum layer 614 is converted to aluminum oxide layer 622, hard aluminum layer 610 is converted to aluminum oxide layer 620, cosmetic aluminum layer 608 is converted to aluminum oxide layer 618, and a portion of hard aluminum layer 606 is converted to aluminum oxide layer 616. Anodic pores 612 are formed within aluminum oxide layers 616, 618, 620, and 622 and transcend the boundaries there between. In other embodiments, substantially all of hard aluminum oxide layer 616 is converted to aluminum oxide. In other embodiments, only a portion of each of aluminum layers 608, 610, and 614 are converted to aluminum oxide.

Figure 7:
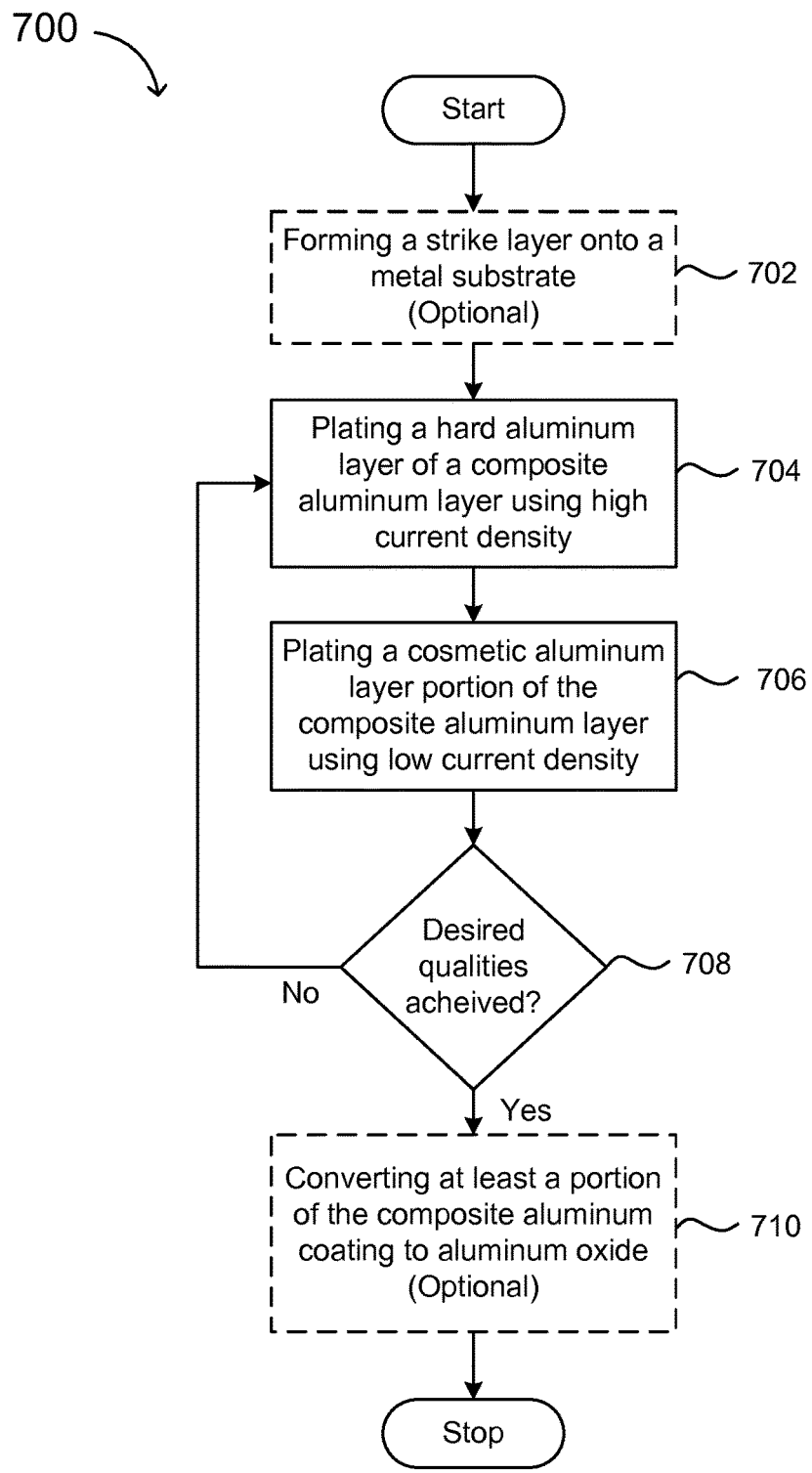
FIG. 7 shows a flowchart indicating an aluminum plating process for forming a multi-layered aluminum coating that includes a hard aluminum layer and cosmetic aluminum layer.

FIG. 7 shows flowchart 700 indicating an aluminum plating process for forming a multi-layered aluminum coating that includes a hard aluminum layer and cosmetic aluminum layer. At 702, an optional strike layer is formed onto a metal substrate. As described above, a strike layer is typically a very thin metal layer (typically less than 0.1 micrometers thick) that adheres well with the metal substrate and is not used in some applications.

At 704, a hard aluminum layer is deposited on the optional strike layer or on the substrate using a high current density plating process. As described above, high current density plating can result in an aluminum layer having a stratified grain structure, which can give the aluminum layer more resistance to indentation as measured by Vickers testing compared to an aluminum layer formed using a lower current density plating process. In some embodiments, the hard aluminum layer is made of an aluminum alloy. In some embodiments, the hard aluminum layer is made of pure or nearly pure aluminum. The current density used to form the hard aluminum layer and the thickness of the hard aluminum layer can vary depending in part on the application. In some embodiments, a current density of about $1.0$ $A/dm^2$ and higher is used. In some embodiments, a current density ranging from about $1.0$ $A/dm^2$ and about $10.0$ $A/dm^2$ is used. In some embodiments, a current density ranging from about $2.0$ $A/dm^2$ and about $3.0$ $A/dm^2$ is used. The hard aluminum layer can be deposited to any suitable thickness, depending in part on application requirements. In some embodiments, the hard aluminum layer is deposited to a thickness ranging from about 2 micrometers and about 10 micrometers.

At 706, a cosmetic aluminum layer is deposited on the hard aluminum layer. The cosmetic aluminum layer along with the hard aluminum layer form a multi-layered aluminum coating on the substrate. The cosmetic aluminum layer can be deposited using standard or low current density plating processes. In some embodiments, the cosmetic aluminum layer is made of an aluminum alloy. In some embodiments, the cosmetic aluminum layer is made of pure or nearly pure aluminum. The current density and the thickness of the cosmetic aluminum layer can vary depending in part on the application. In general, the lower the current density, the less defects and the less porous the resultant aluminum layer will be. In some embodiments, a current density less than about $2.0 \text{ A/dm}^2$ is used. In some embodiments, a current density ranging from about $0.1 \text{ A/dm}^2$ and about $1.5 \text{ A/dm}^2$ is used. In some embodiments, a current density ranging from about $0.25 \text{ A/dm}^2$ to about $1.0 \text{ A/dm}^2$ is used. The cosmetic aluminum layer can be deposited to any suitable thickness, depending in part on application requirements. In some embodiments, the cosmetic aluminum layer is deposited to a thickness ranging from about 2 micrometers to about 10 micrometers.

At 708, a determination is made as to whether the multi-layered aluminum coating, which includes the hard aluminum layer and the cosmetic aluminum layer, has desired qualities for a particular application. For example, an overall hardness or a particular cosmetic quality of the multi-layered aluminum coating may be desired. If it is determined that the desired qualities have not been achieved, plating an additional hard aluminum layer at 704 and plating of an additional cosmetic coating at 706 can be repeated until it is determined that the desired qualities are achieved. If it is determined that the desired qualities are achieved, at 710 at least a portion of the multi-layered aluminum coating is optionally converted to aluminum oxide. In some embodiments, only a portion of the cosmetic aluminum coating is converted to aluminum oxide. In some embodiments, the entire cosmetic aluminum coating is converted to aluminum oxide. In some embodiments, the entire cosmetic aluminum coating is converted to aluminum oxide and a portion of the, or the entire, hard aluminum layer is converted to aluminum oxide.

Figure 8:
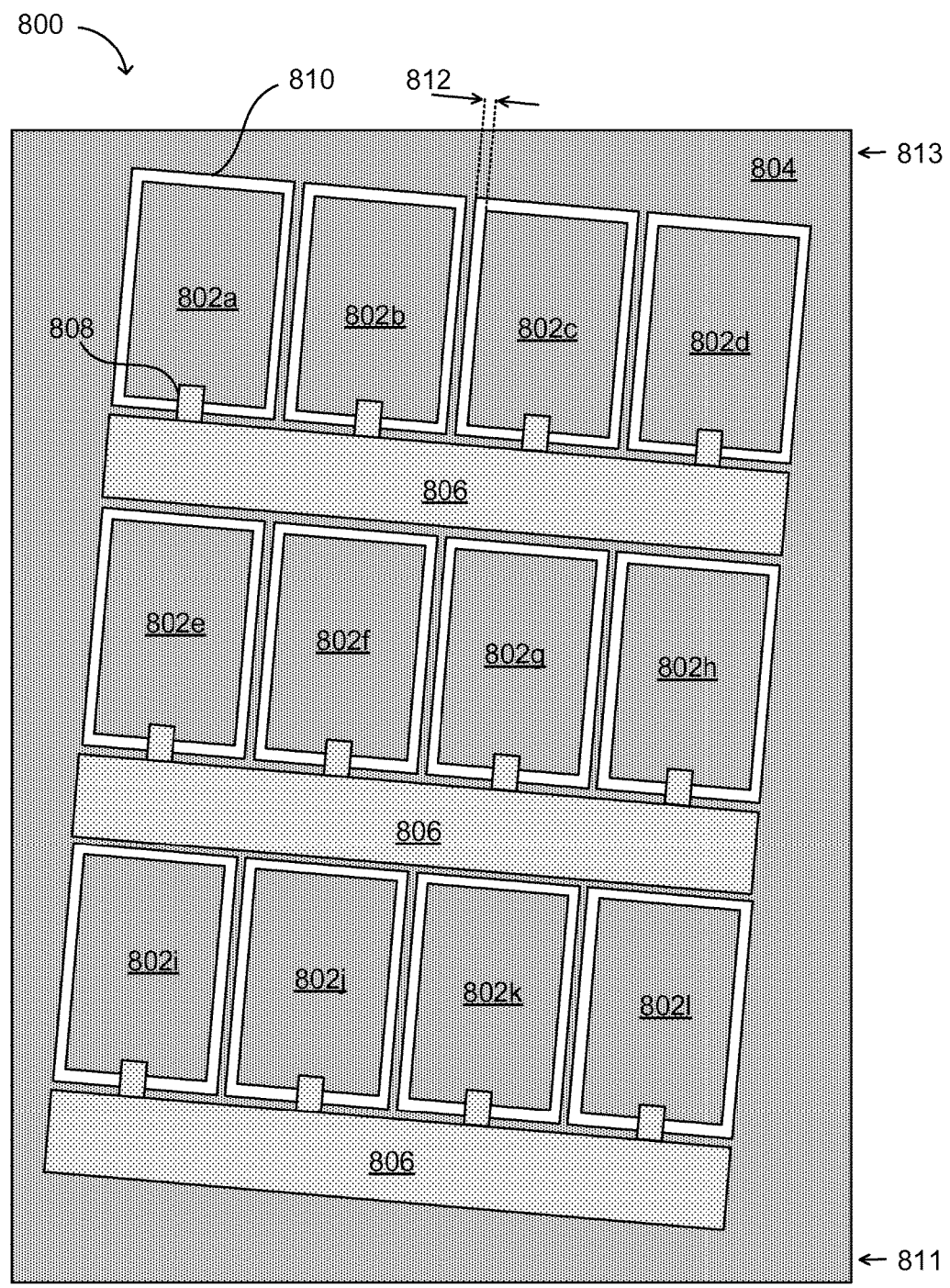
FIG. 8 shows a plating rack assembly suitable for use in a high current density plating process.

As described above, plating under higher current density conditions generally causes the ions to move faster within the plating bath, resulting in a higher rate of plating. In some cases, the faster plating can cause plating to be uneven. For example, edges and corners of a part can get plated faster than flat surfaces of the part. Thus, an aluminum layer can have a varied thickness distribution along the surfaces of the part, with thicker aluminum along edges and corners and thinner aluminum along flat surfaces. In some embodiments, the parts are placed in the plating bath on a plating rack such that the parts are in a particular arrangement to compensate for the tendency for uneven plating when high current density plating. FIG. 8 shows rack assembly 800, which is configured to support parts 802a-802l during a plating process. In some embodiments, rack assembly 800 is used to support parts 802a-802l during processes prior to or subsequent to a plating process, such as anodizing processes. This way, parts 802a-802l can be transferred together as a unit from process station to process station.

Rack assembly 800 can be placed within a plating bath during a plating process with bottom portion 811 oriented toward a bottom of the plating cell and top portion 813 oriented toward a top of the plating cell. Rack assembly 800 includes rack frame 804, drainage bars 806, and cut outs 810. Parts 802a-802l are positioned within cut outs 810 such that each of parts 802a-802l is separated a distance 812 from an edge of rack frame 804. In addition, outward surfaces of parts 802a-802l and outward surfaces of rack frame 804 are along the same plane. Distance 812 should be small enough such that, during a plating process, parts 802a-802l and rack frame 804 approximate a single flat surface. The proximity of parts 802a-802l to rack frame 804 and the positioning of parts 802a-802l along the same plane as rack frame 804 can promote even current density and plating along edges, corners, and flat surfaces of parts 802a-802l. Rack frame 804 can be made of any material suitable for supporting parts 802a-802l during a plating process. In some embodiments, rack frame 804 is made of metal. In some embodiments, rack frame 804 is made of the same metal as parts 802a-802l to improve plating uniformity of parts 802a-802l and to eliminate possible contamination due to dissimilar metal bodies in the plating bath. In one embodiment, rack frame 804 is made of anodizable material such as an aluminum alloy (e.g. 5061 aluminum).

In some embodiments, drainage bars 806 are added to rack assembly 800. Drainage bars 806 are connected with and extend outward from rack frame 804 along a different plane as parts 802a-802l and rack frame 804. Drainage bars 806 can be positioned at an angle relative to rack frame 804 to promote good drainage of chemicals during the plating process. Drainage bars 806 can include connector portions 808 that connect with and fix parts 802a-802l to drainage bars 806. In some embodiments, connector portions 808 are secured to parts 802a-802l using fasteners such as screws. Drainage bars 806 should be made of material that does not interfere with the plating process. In some embodiments, drainage bars 806 are made of substantially the same material as parts 802a-802l and/or rack frame 804 to promote even plating and eliminate possible contamination due to dissimilar metal bodies in the plating bath.

Another factor that can cause uneven plating under high current density conditions is related to the location of the parts within the plating bath. High current density plating can cause different rates of flow of aluminum ions at different locations within the plating bath. That is, a flow of aluminum ions toward a first surface portion of the substrate can be greater than a flow of aluminum ions toward a second surface portion of the substrate. For example, there can be a greater flow of aluminum ions toward a bottom surface portion of a substrate compared to a flow of aluminum ions toward a top surface portion of a substrate, resulting in more aluminum plated at the bottom surface portion of the substrate.

If multiple substrates are plated in a single plating process, such as parts 802a-802l in racking assembly 800, there can be uneven plating among different parts 802a-802l, depending on their relative positions within the plating bath. For instance, parts 802a-802d positioned at the top of the plating bath, parts 802e-802h positioned in the middle of the plating bath, and parts 802i-802l positioned at the bottom of the plating bath can have different amounts of aluminum plated on them. That is, the current density can vary at bottom portion 811 and top portion 813. In one embodiment, high current density plating causes parts 802i-802l positioned at bottom portion 811 to plate faster than parts 802a-802d positioned at top portion 813. In one example, current density at bottom portion 811 was calculated at about $1.8 \text{ A/dm}^2$ while current density at top portion 813 was calculated at about $1.2 \text{ A/dm}^2$ even though the average current density was calculated at about $1.5 \text{ A/dm}^2$.

Figure 9A:
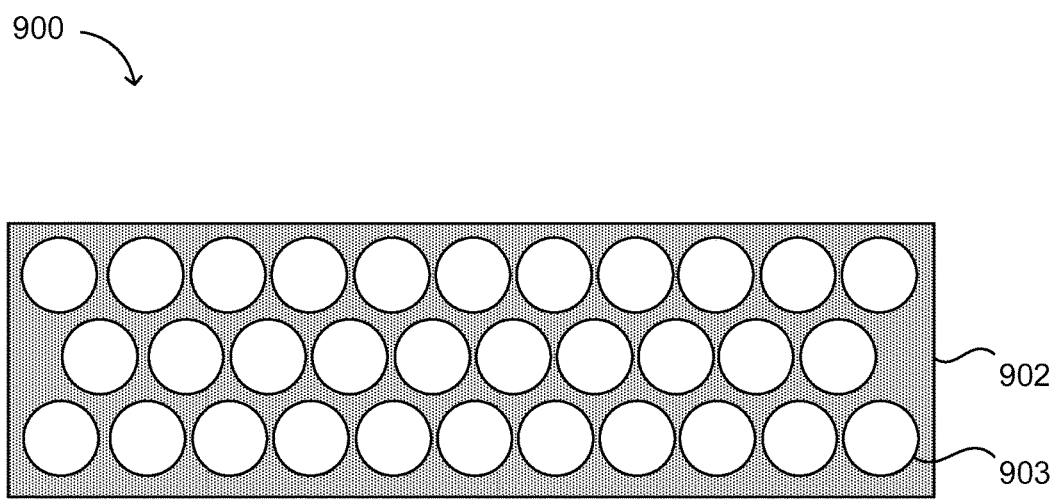
FIGS. 9A-9D show embodiments of current filters that can be used to compensate for uneven plating that can occur during high current density plating processes.

To compensate for this type of uneven plating, a current filter can be used to adjust the amount of plating on different surface portions a substrate. FIGS. 9A-9D show embodiments of current filters that can be placed between an anode and a cathode substrate in accordance with described embodiments. FIG. 9A shows current filter 900 that can be place between an anode and a cathode substrate to control the flow of aluminum ions toward the cathode substrate. Current filter 900 includes solid portion 902 that blocks passage and openings 903 that allow passage of aluminum ions to the cathode substrate. Current filter 900 should be made of a material that does not interfere with the plating process. In some embodiments, current filter 900 is made of a non-metallic material such as plastic, silicone, ceramic, or glass. Openings 902 can have any suitable geometric shapes, including round, oval, square, rectangular, or triangular shapes. The diameters of openings 902 can vary depending upon the plating apparatus setup, current densities, and plating process conditions. In one embodiment, openings 902 are about 0.15 mm in diameter.

Figure 9B:
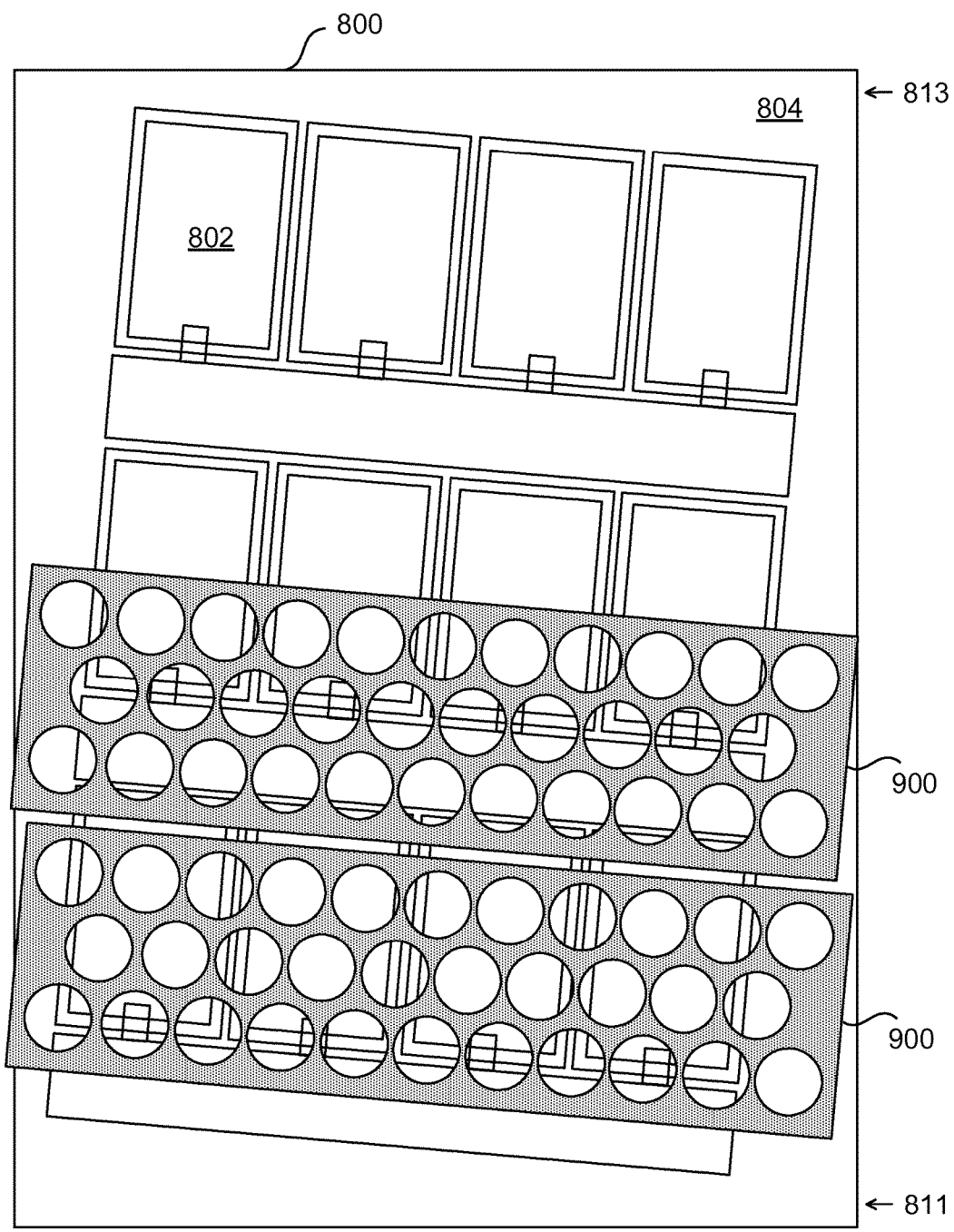

FIG. 9B shows two current filters 900 positioned in front the bottom half of rack assembly 800, including bottom portion 811. Solid portions 902 can block the flow of aluminum ions toward rack assembly 800 while openings 903 can allow the flow of aluminum ions toward rack assembly 800. This configuration can compensate for a tendency for higher current density at bottom portion 811, resulting in substantially the same amount of aluminum plated on top 813 and bottom 811 portions of rack assembly 800. In some embodiments, only one current filter 1000 is used. In some embodiments, a number of current filters 900 are used. The distance between current filter 900 and the cathode substrate can be adjusted to achieve a desired plating rate. Current filter 900 should be far enough from the cathode substrate such that plating reactions at the cathode are not adversely interfered. In one embodiment, current filter 900 is placed about 30 mm away from the cathode substrate.

Figure 9C:
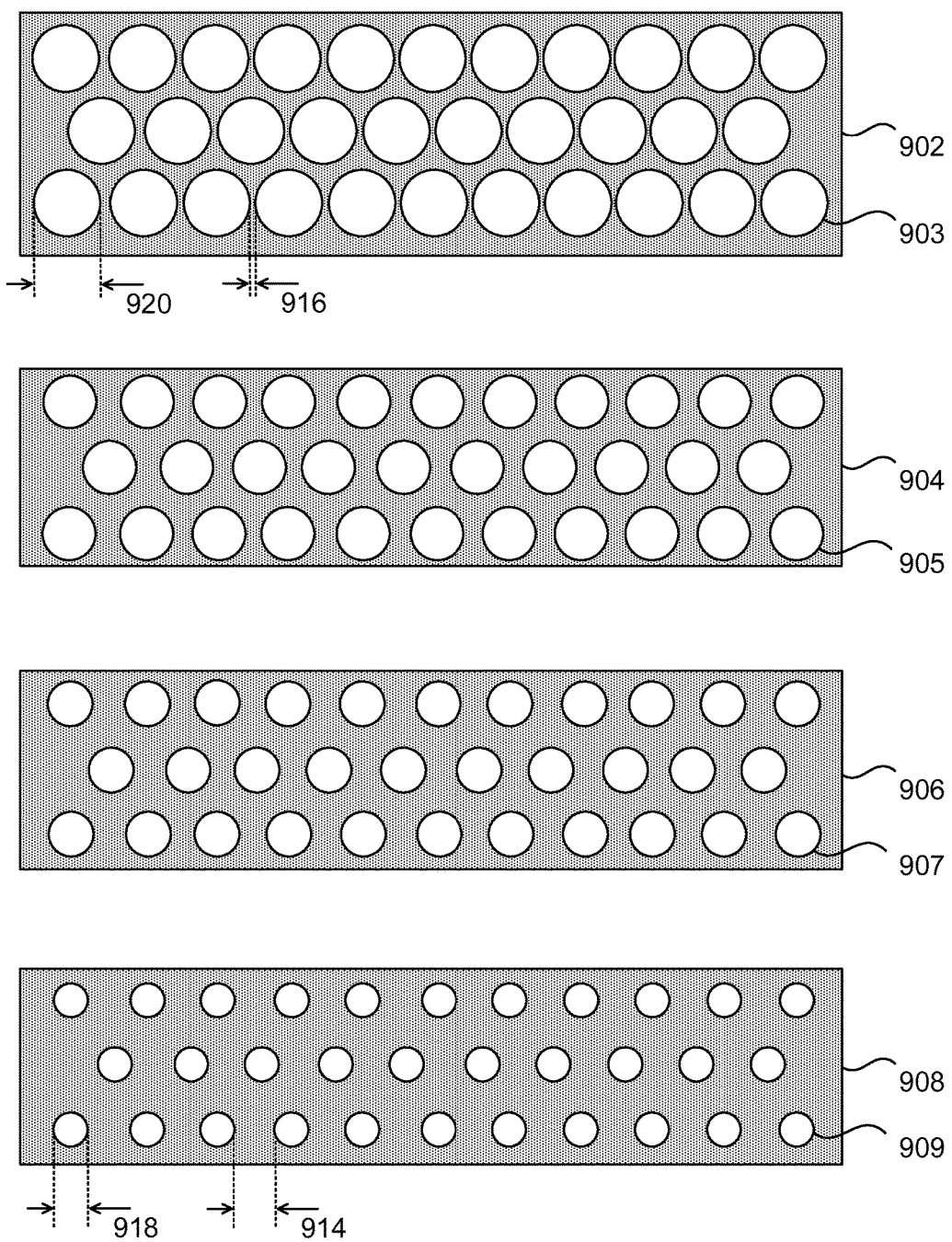

FIG. 9C shows four separate current filters 902, 904, 906, and 908 having successively smaller openings 903, 905, 907, and 909, respectively. One or more of current filters 902, 904, 906, and 908 can be placed in front of a cathode substrate to control the flow of aluminum ions toward the cathode substrate. As shown, current filters 902, 904, 906, and 908 have different percentages of open area. For example, openings 908 of current filter 908 have diameters 918 that are smaller than diameters 920 of openings 903 of current filter 902. In addition, spacings 914 between openings 908 of current filter 908 are larger than spacings 916 between openings 903 of current filter 902. Thus, current filter 902 has a higher percentage of open area to allow more ions to pass through to the cathode substrate compared to current filter 908. One can customize the flow of ions reaching different portions of a cathode substrate by placing appropriate current filters 902, 904, 906, and 908 between the anode and the cathode, or by using no current filter in certain portions.

Figure 9D:
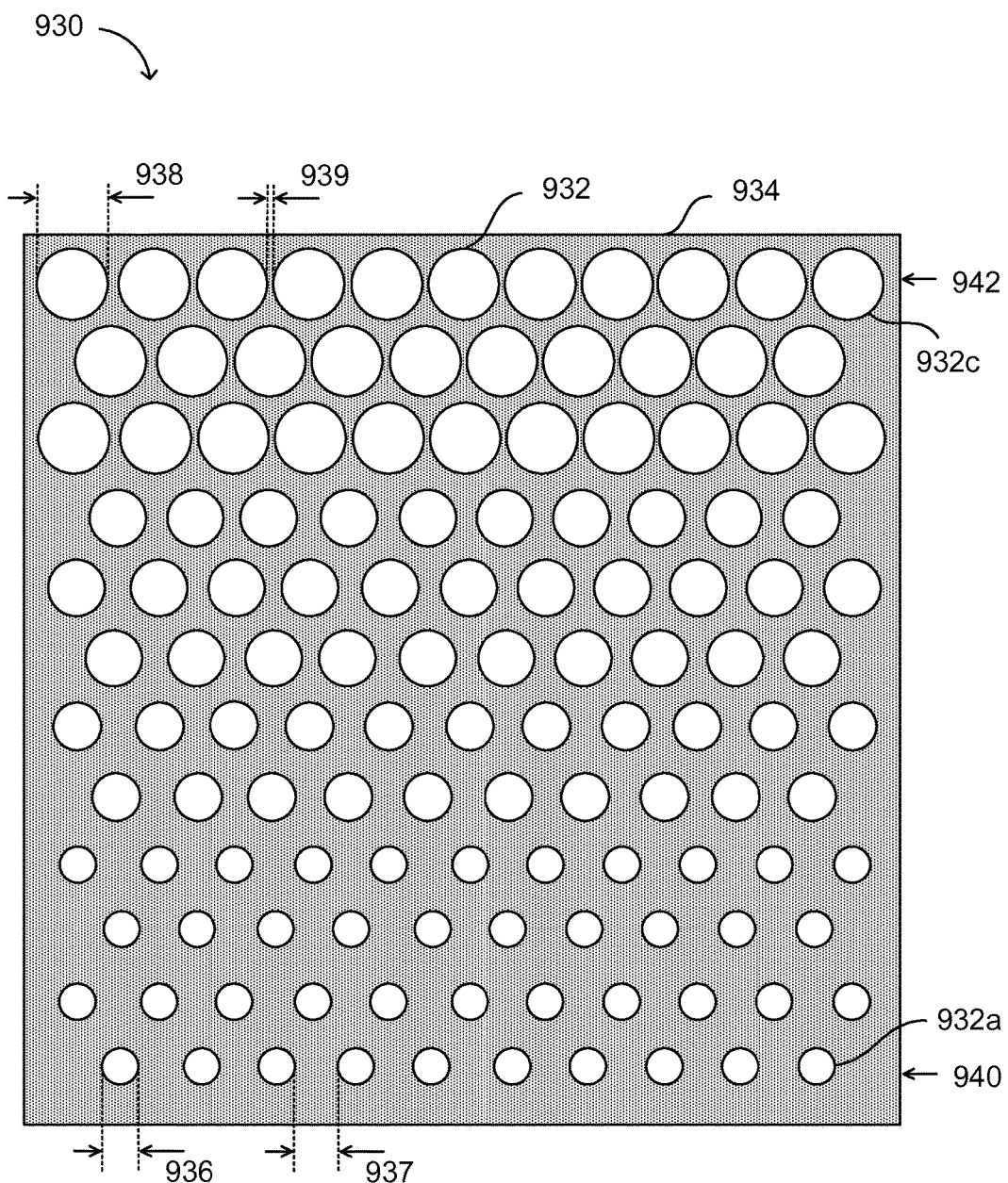

FIG. 9D shows another current filter 930 having different sized openings 932 within solid portion 934. As shown, the sizes of openings 932 get larger moving from bottom portion 940 to top portion 942 of current filter 930. For example, openings 932 are arranged such that openings 932a having small diameters 936 are positioned at bottom portion 940 and openings 932c having larger diameters 938 are positioned at top portion 942 of current filter 930. In addition, distances 937 between openings 936 at bottom portion 940 are larger than distances 939 between openings 932c at top portion 942 of current filter 930. Thus, current filter 930 can be said to have graduated percentages of open area along its height.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method of forming a multi-layered aluminum coating on a substrate, the method comprising:
    electrodepositing a first portion of an aluminum layer on the substrate using a first current density causing the first portion to have a first average grain size; and
    electrodepositing a second portion of the aluminum layer on the first portion of the aluminum layer using a second current density, lower than the first current density, causing the second portion of the aluminum layer to have a second average grain size larger than the first average grain size.

2. The method of claim 1, further comprising:
    converting at least part of the second portion to an aluminum oxide layer.

3. The method of claim 2, further comprising:
    converting least part of the first portion to a second aluminum oxide layer.

4. The method of claim 1, wherein the first average grain size ranges from about 0.1 and about 4.0 micrometers.

5. The method of claim 1, wherein the first portion is characterized as having a hardness value greater than a hardness value of the second portion.

6. The method of claim 1, wherein the second portion is optically brighter than the first portion.

7. The method of claim 1, wherein the first portion is characterized as having more grain boundaries per unit volume than the second portion.

8. The method of claim 1, wherein the first current density ranges from about 1.0 A/dm$^2$ and about 10.0 A/dm$^2$ and the second current density ranges from about 0.1 A/dm$^2$ and about 1.5 A/dm$^2$ independent of the first current density.

* * * * *